3,784,670
TITANIUM DIOXIDE CONCENTRATE AND ITS MANUFACTURING PROCESS

Shigeki Yamada, Kyoto, and Kokichi Miyazawa, Hideaki Naka, and Yoshio Yoshida, Kusatsu, Japan, assignors to Ishihara Sangyo Kaisha Ltd., Osaka, Japan
No Drawing. Continuation-in-part of abandoned application Ser. No. 68,555, Aug. 31, 1970. This application Apr. 10, 1972, Ser. No. 242,772
Claims priority, application Japan, Sept. 12, 1969, 44/72,016, 44/72,017; Sept. 22, 1969, 44/74,672
Int. Cl. C01g 23/00; C22b 1/00
U.S. Cl. 423—80
16 Claims

ABSTRACT OF THE DISCLOSURE

An improved process for leaching a titaniferous iron ore with an acid to remove iron and concentrate the titanium valve. The ore is leached with a mineral acid and the intermediate concentrate during the process of acid-leaching is magnetically separated into a fraction which is sufficiently concentrated and a fraction which is not sufficiently concentrated and only the latter is continuously leached. The concentration is effectively and economically carried out to give a high grade concentrate which has a coarse grain and a good fluidity.

CROSS-REFERENCE TO RELATED APPLICATION

This application is a continuation-in-part of Ser. No. 68,555, filed Aug. 31, 1970 now abandoned.

BACKGROUND OF THE INVENTION

Field of the invention

The present invention relates to a process for producing a titanium dioxide concentrate from a titaniferous iron ore. More particularly, it relates to a process for producing a titanium dioxide concentrate rich in titanium value by leaching a titaniferous iron ore such as, for example, ilmenite, leucoxene, arizonite, etc. with a mineral acid to remove an acid soluble component such as iron.

Description of the prior art

In the production of titanium dioxide pigment by the chloride process and the industrial production of metallic titanium, the raw material to be used is required to be high in grade and with a good fluidity because of passing such processes as chlorinating the titanium-containing feed material by the fluidized bed chlorination process and separating impurities for obtaining the titanium tetrachloride, and a naturally occurring rutile ore has hitherto been mainly used as the raw material. Rutile ore is also used as a raw material for welding rod production in abundance. However, the reserves of rutile ore are low and, recently, are going to be exhausted as the demand is increased.

As a result, it has been attempted to produce a rutile-like-titanium dioxide concentrate by beneficiating a low grade titaniferous iron ore, such as ilmenite, which has a lower titanium value content and a higher reserve. As one of the methods of beneficiating the titanium content in titaniferous iron ore, there is an acid-leaching method in which the titanium content in the ore is concentrated by leaching the titaniferous iron ore such as, for example, ilmenite, with a mineral acid to remove the iron content and the acid-soluble impurities by dissolution. This method is relatively simple in operation, but it is difficult to obtain a high grade of titanium dioxide concentrate such as, for example, higher than 80% by weight of titanium dioxide under conventional industrial conditions.

In order to obtain a high grade of titanium dioxide concentrate according to this method, the raw material ore to be used must be finely ground and leached at a high temperature and high pressure for a long period of time, and in addition to being expensive, the concentrate obtained is a fine powder and is not suitable for the production of titanium tetrachloride by the fluidized bed chlorination process and the manufacturing of welding rods.

An object of the present invention is to produce a titanium dioxide concentrate high in titanium value by leaching titaniferous iron ore of coarse grain with acid effectively and with relatively low cost through an improvement of the above-described acid-leaching method, and to produce the titanium dioxide concentrate of coarse grain having the same fluidity as that of naturally occurring rutile ore, by reducing the formation of fine powder in the acid-leaching process.

A further object is to provide a process for producing a titanium dioxide concentrate which is easy in operation and suitable for an industrial practice on a large scale.

Other objects and advantages of the present invention will be clear from the following description.

Among various titaniferous iron ores there are those produced from rock deposits and others produced from sand deposits. The former are approximately ground and the latter appear in their original sandy form without being ground, and are respectively made to a grain size of 20 to 200 mesh measured by a Tyler screen, from which are removed gangue and impurities by means of ore dressing such as mangetic separation and are supplied as a coarse grain ore of 40 to 60% by weight in titanium value. In general, it is difficult to obtain such a high grade of titanium dioxide concentrate as being 90% by weight in $TiO_2$ by acid-leaching of such material without crushing and when the acid-leaching of such material is carried out for a long time to obtain a high grade concentrate, a fine powdery titanium dioxide concentrate is formed. However, the present inventors have found that an unexpectedly large difference in the degree of concentration of titanium content exists among the various particles and that the particles concentrated to the desired grade were already present at the initial stage of leaching where the $TiO_2$ grade as a whole is not so high; for example, in about one hour after the initiation of the reaction in a sulfuric acid-leaching process.

The reason for the fact that, when acid-leaching such titaniferous iron ore in its original form as coarse grain ore with a mineral acid, the particles are remarkably different in degrees of concentration of titanium content has not yet been determined; however, the following are presumed to influence the advance of reaction during the acid-leaching: (a) the fact that the ore particles are largely different in degrees of structural change by alternation and have a different reactivity with the acid, (b) the fact that even particles having the same size are largely different in the effective reaction surface area depending on the extent of cracks in the particles, and (c) the fact that the particles are different in particle size and other physical properties, etc.

SUMMARY OF THE INVENTION

The present inventors have found that the intermediate concentrate during the acid-leaching process has a coarse grain which is substantially the same particle size as the original raw material ore, and that it is possible to magnetically separate this concentrate in a strong magnetic field and that, as a result, it can be relatively easily separated into particles which are sufficiently concentrated to the desired grade and other particles which are insufficiently concentrated. It has been thus discovered that a coarse grain, high grade titanium dioxide concentrate can be easily, industrially and advantageously manufactured by magnetically separating the aforesaid intermediate concentrate to remove from the system those particles which are sufficiently concentrated to the desired grade as a coarse grain, high grade product concentrate and continuing the acid-leaching process of only the particles which are insufficiently concentrated.

Briefly, the process of the present invention comprises:

(a) Leaching the ore with a mineral acid to concentrate the titanium value;

(b) Magnetically separating the intermediate concentrate into two fractions—one which comprises particles concentrated to the desired degree as a non-magnetic fraction and one which comprises particles insufficiently concentrated as a magnetic fraction;

(c) Re-leaching the magnetic fraction to further concentrate the titanium value thereof;

(d) It is sometimes necessary to conduct a reduction to convert the major portion of the ferric iron in the ore to ferrous iron before leaching (a);

(e) Optionally, the ore is oxidized to convert the ferrous iron in the ore to ferric iron before said reduction (d);

(f) Optionally, the ore is preliminarily leached with a mineral acid to remove a portion of the iron value before said reduction (d); and (g) It is sometimes necessary to conduct a preliminary magnetic separation to obtain an ore fraction which can easily be leached with a mineral acid to concentrate the titanium value. This preliminary magnetic separation produces an ore fraction which may be readily concentrated by acid leaching. This step is only necessary when dealing with an ore which is difficult to concentrate.

DETAILED DESCRIPTION OF THE PREFERRED EMBODIMENTS

The advantages of the present invention are as follows:

(a) A high grade titanium dioxide concentrate comparable to rutile ore can be obtained since, in spite of using coarse grain ore, the particles are sufficiently and reasonably leached depending upon the degrees of reactivity, (b) The formation of fines can be reduced in the leaching process because the concentrated particles are removed from the system in order of reactivity and the concentrates so obtained are coarse in size and close to the raw material coarse grain ore and have physical properties suitable for use as feed stocks for fluidized bed chlorination process and welding rod production;

(c) The time required for the acid-leaching per raw material ore is reduced, the amount of mineral acid required for the leaching process is saved and the capacity required for the acid leaching tank can be decreased;

(d) It is not necessary to elevate the titanium value of the entire leached product because of the magnetic separation of the intermediate concentrate into the sufficient concentrate and the insufficient concentrate and, therefore, the leaching of the present invention is very appropriate for application to a multiple-stage continuous system leaching and can be easily adapted to industrial mass production.

The process for production of a titanium dioxide concentrate according to the present invention comprises leaching a titaniferous iron ore having a grain size such that the particles do not pass through a 200 mesh Tyler standard sieve with a mineral acid to concentrate the titanium value, magnetically separating the intermediate concentrates to separate the same into particles concentrated to the desired grade as a non-magnetic fraction and particles insufficiently concentrated as a magnetic fraction and again leaching the magnetic fraction with a mineral acid to concentrate the titanium value to obtain a high grade titanium dioxide concentrate.

The titaniferous iron ore used as the raw material ore is an iron-containing titanium ore such as ilmenite; an altered ore of ilmenite, for example, arizonite; a mixed crystal of ilmenite, for example, ilmenite-hematite ore, leucoxene, etc.; or a titaniferous iron material prepared by physically or chemically processing the ores as described in the following description.

Among such titaniferous iron ores, there are massive type ores produced from rock deposits and sand type ores produced from sand deposits in beaches or river beds. In the process of the present invention, either type can be used, the sand type being preferred.

The sand type titaniferous iron ore is dressed as it is while the massive type ore is first crushed and then dressed. Generally, the ores which are used have a grain size of not smaller than 200 mesh measured by the Tyler standard. In the process of the present invention, such coarse grain ore may be used as is, without crushing. In general, grain sizes of 20 to 200 mesh (Tyler standard) are preferable. If fine powder ore of less than 200 mesh is used, the titanium dioxide concentrate obtained is too fine to be used as a raw material for a fluidized bed chlorination process or for welding rod production, and also it is difficult to apply the magnetic separation during the leaching process and, therefore, the full benefits of the present invention can not be achieved. Alternatively, when the particle size is too large, concentration is difficult and a high grade material cannot be obtained.

The degree of difficulty encountered in concentrating the titanium value by an acid-leaching process varies depending upon the sources and kinds of titaniferous iron ore employed. The present inventors have found that, when the ore is preliminarily magnetically treated to remove particles of less than 100 and of more than 400 in "Relative Magnetism" [the basis being 100, of standard iron oxide ($\alpha$-$Fe_2O_3$), as described hereinbelow], the remaining fraction has an average value of "Relative Magnetism" in the range of 250–150, and despite the lack of remarkable differences in chemical composition compared with the other fraction, may be readily concentrated by leaching with a mineral acid. Therefore, in some cases, it is desirable that, when using an ore which is difficult to concentrate, the ore be previously magnetically separated and a fraction suitable for concentration be collected as a raw material. By the above "standard iron oxide" is meant $\alpha$-$Fe_2O_3$ obtained by dissolving a special grade reagent of ferrous sulfate in a deionized water, oxidizing it with air while neutralizing with ammonia to precipitate a hydrated iron oxide, filtrating it and washing with water and calcining it at 800° C. for 2 hours.

The specific conditions of the preliminary magnetic separation are varied depending upon the kinds of magnetic separator, the amount of feed, the velocity of ore through the magnetic field, and the physical properties of the ore and, therefore, they cannot be stipulated summarily. However, in the case of using the Rapid type magnetic separator which is one kind of belt-type rotating disc separator, the fraction suitable for concentration (i.e., that fraction remaining after particles of a Relative Magnetism of below 100 and above 400 have been removed) is collected as a magnetic fraction only when the strongest magnetic flux density on the belt is in the range of 9,000 to 15,000 gauss. In this case, 9,000 gauss and 15,000 gauss, correspond to 400 and 100 in "Relative Magnetism" respectively, and the collected fraction (i.e., that fraction which will be concentrated) has average values of "Relative Magnetism" in the range of 250–150. Also, when using other magnetic separators, the conditions can be established so as to be optimum to collect the fraction having the Relative Magnetism as above-described.

The titaniferous iron ore employed usually contains an iron value in the ferric state of 10 to 80 weight percent. Since this ferric iron value is difficult to remove by leaching with a mineral acid, at least most of the ferric iron value is preferably transformed into the ferrous state. Preferably at least 95 weight percent of the total iron value is converted to the ferrous state, by previously reducing the raw material ore. This reduction need not be so strong so as to convert the iron value to the metallic iron state and it is not preferable that sintering and melting of the raw material particles occur during this reduction. The detailed conditions of this reduction can be determined in accordance with the general reducing reaction, generally this reduction is performed at 500 to 950° C. in the presence of the reducing agents. If solid reducing agents are used, the adidtive amount of the reducing agents are, in general, 3 to 10 weight percent of the amount of the raw material ore. The reducing agent used includes coal, charcoal, anthracite, coke, hydrogen gas and carbon monoxide gas, and in addition, a mixture of carbon monoxide and hydrogen obtained from steam-reforming of a natural gas of naphtha, or by partial oxidation of fuel oils.

It is desirable as a mode of practice of the present invention that, before this reduction, the ore is preliminarily leached with a mineral acid to remove a part of the iron value, usually 10 to 20 weight percent of the iron value, by dissolution. Thus, if the ore is reduced after a preliminary leaching, in the subsequent beneficiation of the titanium value by leaching with a mineral acid, the dissolution of the iron value becomes very easy, the concentration proceeds sufficiently and, in addition, the formation of fines during leaching is reduced to bring about more desirable effects on the present process. The concentration of acid during this preliminary leaching is 100 to 600 g./l. desirably 200 to 500 g./l. as free sulfuric acid and, in case of hydrochloric acid, is above 100 g./l., desirably 150–250 g./l. as free hydrochloric acid. The temperature at the time of preliminary leaching is desirably above 80° C.

The titanium value of the titaniferous iron ore or the ore obtained by the pretreatment as described above is concentrated by dissolving and removing at least a part of the iron value by leaching with a mineral acid. The mineral acid which may be used includes sulfuric acid, hydrochloric acid and industrial waste acids containing any one or both of them, etc.; and industrial waste acids containing sulfuric acid, for example, waste sulfuric acid discharged from the hydrolysis step in the production of pigmentary titanium dioxide by the sulfate process, pickling waste acid, etc. are sufficiently effective and are suited to be used for industrially operating the present process. In case of sulfuric acid, the concentration of acid during the acid-leaching is 100 to 600 g./l., desirably 200 to 500 g./l. as free sulfuric acid and, in case of hydrochloric acid, is above 100 g./l., desirably 150 to 300 g./l. as free hydrochloric acid. Although either an open type vessel or a closed type vessel may be used in the leaching, if the leaching is performed at an elevated temperature by using a closed type vessel, high grade titanium dioxide concentrate can be obtained in a shorter time. The temperature at the time of leaching is desirably above 80° C. and the leaching is generally conducted for from 2 to 10 hours.

If a seed for accelerating the hydrolysis of titanium salt is added during the leaching with a mineral acid, the dissolution of iron value is promoted while controlling the dissolution of titanium value. And also, the presence of titanium(III) salts and/or fluorine ions in the system aids the dissolution of the iron value. Therefore, a more desirable concentration effect can be expected by the addition of these materials.

The seed for accelerating the hydrolysis of the titanium salt indicates a seed used for hydrolyzing a solution of titanium salt to precipitate the titanium value, in the presence of which the hydrolysis is accelerated in the thermal hydrolysis step of an aqueous solution of the titanium salt, for example, titanyl sulfate, titanium tetrachloride, etc.; and, which is generally colloidal and, specifically, for example, is a hydrated metal oxide having seed activity of titanium, tin, niobium, tantalum, silicon, etc., obtained by any of the following processes:

(1) An aqueous solution of a titanium salt such as titanyl sulfate, titanium tetrachloride, etc. is neutralized with ammonia or other alkaline material to obtain a colloidal hydrated titanium oxide. The seed activity can generally be increased by aging, if necessary.

(2) A solution of a titanium salt such as titanyl sulfate, titanium tetrachloride, etc., after being partially neutralized, is heated or a preheated solution is added to hot water to thermally hydrolize the same to obtain a hydrated colloidal titanium oxide;

(3) An aqueous solution of a niobium or tantalum salt such as niobium pentachloride, tantalum pentachloride, etc., for example, in a hydrofluoric acid solution, is neutralized with ammonia or other alkaline material to obtain a hydrated colloidal niobium or tantalum oxide, whose seed activity can be increased by aging;

(4) An aqueous solution of a stannate, or silicate, for example, sodium stannate, sodium silicate, etc., is added to a mineral acid to obtain a hydrated colloidal tin oxide, or silicon oxide;

(5) An aqueous solution of a stannate or silicate, for example, sodium stannate or sodium silicate is added to a system in which titaniferous material is leached with a mineral acid to form a colloidal substance in the system.

The preparation of the seed used in the present invention is not limited to the above-described methods, but, in addition to the above embodiments, any seed may be used if it has a similar seed activity. For example, the preparation method described in pages 264 to 278, "Titanium," 2nd edition, 1966, by Jelks Barksdale, The Ronald Press Company, New York, U.S.A. can be employed. However, fine particles of titanium dioxide hydrate as formed in leaching the titaniferous material with a mineral acid are low in activity as a seed and has no value as a seed in the practice of the present invention.

The necessary addition amount of the seed in the acid-leaching reaction is varied depending upon the raw material, operating conditions, etc., and, in general, the molar percentage of the metal oxide in the seed per titanium dioxide content in the raw material is 0.1 to 10%, usually 0.3 to 5.0%. This range may, of course, be varied depending upon the degree of seed activity, and 0.1 mole percent is the lower limit in the case of employing a seed having relatively high activity. In case of below 0.1 mole percent, it is low in practical use because the effect of the present invention is not sufficient, and above 10 mole percent is occasionally ineffective for such increment and thus is economically unattractive.

When acid-leaching is conducted in the presence of a titanium(III) salt, such as titanous sulfate, it may be added to the leaching system or may be formed in the system by adding a reducing substance such as metallic iron powder, capable of being dissolved in the leaching liquor and reducing a titanium(IV) salt in the liquor. In general, the concentration of titanium(III) salt to be present in the system is more than 1 g./l., preferably more than 3 g./l. as $TiO_2$. Specifically, when said seed and said titanium(III) salt are added to the leaching system, a more desirable concentration effect can be expected.

And also, as the source of fluorine ion, there may be used: hydrofluoric acid, ammonium fluoride, calcium fluoride, etc. In general, the amount of fluorine ion to be added is 0.5 to 10%, by weight, on the basis of the weight of raw material.

This leaching is discontinued before the iron dissolving velocity as a whole slows down since it is not necessary to elevate the titanium value of the total leaching product to the desired concentration. Therefore, fines are scarcely formed during this leaching and the intermediate concentrate so obtained maintains substantially the particle size of the raw material ore and contains (1) particles which are highly concentrated in titanium value by sufficient leaching to remove the acid soluble impurities such as iron and (2) particles which have not yet been so highly concentrated because of insufficient leaching.

In the present invention, the intermediate concentrate while being leached is magnetically separated in a strong magnetic field to separate particles concentrated to the desired value as a non-magnetic fraction. The conditions for the magnetic separation are established depending upon the desired value of titanium dioxide concentrate and, in general, if separation is made for non-magnetic particles having a "Relative Magnetism" of below 200, and magnetic particles having a "Relative Magnetism" of more than 200, a concentrate having a high percent $TiO_2$ value comparable to rutile ore, for example, above 95 weight percent $TiO_2$, can be obtained as a non-magnetic fraction having an average value of "Relative Magnetism" of below 100 and a low grade concentrate is obtained as a magnetic fraction.

In other words, one must first determine what the desired degree of concentration is. Assuming a given value is chosen, the conditions for the magnetic separation of the intermediate concentrate can be regulated such that the non-magnetic fraction contains particles whose percent $TiO_2$ value is at least equal to the given value. This is done as follows. Generally, the $TiO_2$ content of the particles decreases with increasing Relative Magnetism, and one skilled in the art can determine the relationship. Further, in a given fraction of particles, the Relative Magnetism of the individual particles may vary over a broad range. Thus, a given value of Relative Magnetism will correspond to the related $TiO_2$ content of the particular ore being treated. Accordingly, by determining the distribution of Relative Magnetism values in the fraction (i.e., the number of particles having a given Relative Magnetism), one can determine the average Relative Magnetism of the fraction and by selecting an average Relative Magnetism value corresponding to the minimum $TiO_2$ content desired, one can adjust the parameters of the magnetic separation in order to obtain a fraction concentrated to the desired degree.

Thus, in the above specific example where separation is made for particles above and below 200 Relative Magnetism, the non-magnetic fraction (less than 200) has an average Relative Magnetism of less than 100 and thus, high $TiO_2$ content.

Thus, the specific conditions for the magnetic separation depend on the desired $TiO_2$ value and the particular ore involved as indicated above. In addition, the kind of magnetic separator, the feed rate and amount of feed, etc. determine the separation conditions. For example, in the case of using a Rapid type magnetic separator, the strongest magnetic flux density on the belt should be at least 10,000 gauss, which value corresponds to the above-described specific example of a Relative Magnetism of 200. However, this density may be varied depending on the desired separation. By using various types of magnetic separators such as belt types, pulley types, drum types or trough types and establishing the conditions in accordance with the above requirements for magnetic separation, a titanium dioxide concentrate beneficiated to the desired value as a non-magnetic fraction can be separated.

The intermediate concentrate substantially maintains the raw material particle size and is of a particle size not substantially passing through a 200 mesh sieve and, if dried so as to make the adhesive water content 0.5 weight percent or less, the magnetic separation can be easily carried out.

In this magnetic separation, by appropriately leaching with a mineral acid, about 30 to 80 weight percent of the leached intermediate concentrate product can be separated as a high value titanium dioxide concentrate and taken out from the leaching system as a product.

The particles which have an insufficient concentration, which have been obtained as a magnetic fraction, are then leached again with a mineral acid to beneficiate the titanium content to the desired value, or returned to the leaching step of the raw material. The re-leaching of this magnetic fraction may be conducted under the same conditions as in the above-described first stage leaching of ore. When the magnetic fraction is reduced under the same conditions as in the above-described reduction of ore before the re-leaching, the titanium value is transformed to a form which is more difficult to solubilize in the acid, and the iron value becomes more easily soluble in the acid. This is preferable for obtaining a high value titanium dioxide concentrate without forming fines.

The first mode of practice desirable for an industrial operation of the process of the present invention comprises leaching, with a mineral acid, the raw material titaniferous iron ore, regardless of any pre-reducing step, and magnetically separating the intermediate concentrate into a non-magnetic fraction and a magnetic fraction; the non-magnetic fraction being taken out from the system and the magnetic fraction being returned to the step of treating the raw material titaniferous iron ore thereby mixing it with the raw material titaniferous iron ore for further treatment, thus achieving a continuous treatment.

The second mode of the process of the present invention comprises (1) pre-leaching the raw material titaniferous iron ore with a mineral acid to dissolve and remove a part of the iron value in said ore, (2) reducing the pre-leached material to change at least most of the ferric value in the pre-leached material to a ferrous value, (3) leaching the reduced material with a mineral acid to concentrate the titanium value, and (4) magnetically separating the intermediate concentrate into a non-magnetic fraction and a magnetic fraction; the non-magnetic fraction being taken out from the system and returning the magnetic fraction to any former step and mixing the magnetic fraction with the raw material in that step for re-treatment.

The third mode of practice of the process of the present invention comprises (1) magnetically separating the raw material titaniferous iron ore and collecting a fraction having a "Relative Magnetism" of 250 to 150, (2) reducing the collected fraction to change at least most of the ferric value therein to a ferrous value, (3) leaching the reduced material with a mineral acid to concentrate the titanium value, and (4) magnetically separating the intermediate concentrate into a non-magnetic fraction and a magnetic fraction, the non-magnetic fraction being taken out from the system and returning the magnetic fraction to any former step and mixing the magnetic fraction with the raw material in that step for re-treatment.

The modes of practice desirable for industrial operation of the process of the present invention are not limited to the above three modes but may be carried out in various combinations thereof within the scope in which the effect of the present invention is exhibited.

The leaching with a mineral acid according to the process of the present invention, particularly in the case of adopting the above-described types of operation, is very suitable for carrying out the leaching treatment itself by a continuous system. Ordinarily, in order to obtain a sufficiently high grade titanium dioxide concentrate by leaching the titaniferous iron ore with a mineral acid, in general, treatment in a continuous system in a large number of stages and for a long retention time in each stage is required. However, in the present invention, it is not necessary to elevate the titanium value of the entire product in the leaching step since the intermediate concentrate during the process of leaching is magnetically separated into particles in which the concentration is sufficient and particles in which the concentration is not yet sufficient and the former is taken out from the system. Therefore, the occurrence of difference of reactivity among the particles by decreasing the number of stages may not be of major importance and also, the retention time can be relatively shortened, so the total tank capacity can be reduced.

A high grade titanium dioxide concentrate obtained by separating as a non-magnetic fraction in the magnetic separation step or by re-leaching the part separated as a magnetic fraction in the magnetic separation step is already concentrated to the desired grade while maintaining the particle size of the raw material ore, and possesses physical properties suitable for use as a raw material for fluidized bed chlorination processes or welding rod production. If necessary, the small amount of fine powders which may be formed in the treatment is removed by any appropriate means, such as sieving. These fines can be utilized for other uses as is or may be granulated and used in the same way as coarse grains.

Percent values given in the following examples are in weight percent values.

EXAMPLE 1

Ilmenite of Indian origin having the composition shown in Table 1 and the particle size distribution shown in Table 2 was used as a raw material titaniferous iron ore.

TABLE 1

| Component: | Content (percent) |
|---|---|
| $TiO_2$ | 59.62 |
| Total Fe | 24.46 |
| FeO | 9.49 |
| $Fe_2O_3$ | 24.62 |

TABLE 2

| Particle size (mesh): | Content (percent) |
|---|---|
| 42–60 | 14.8 |
| 60–100 | 69.4 |
| 100–150 | 14.4 |
| 150–200 | 1.4 |

100 parts by weight of the above-described ore was mixed with 5 parts by weight of petroleum coke and heated for reduction in a furnace cut off from air at 900° C. for 1 hour. The system was cooled while passing a nitrogen gas therethrough, and after separating the excess coke, was subjected to acid-leaching. Industrial waste sulfuric acid (A) discharged from the hydrolysis step for the production of titanium dioxide by the sulfate process having the composition shown in Table 3 was used as the leaching acid.

TABLE 3

| Component: | Content (g./l.) |
|---|---|
| Free $H_2SO_4$ | 350 |
| Total Fe | 37 |
| $TiO_2$ | 8.2 |

The reduced ore and 3 liters of the waste sulfuric acid (A) per 1 kg. of the reduced ore were placed in an autoclave and maintained at 130° C. for 6 hours under stirring (autoclave pressure: 1.5 kg./cm.$^2$ gauge) and after leaching were filtered.

The intermediate concentrate separated from the reaction liquid was sieved to remove fines of below 200 mesh and air dried. The intermediate concentrate was such a grade as being 80.8% by weight $TiO_2$ and 12.5% by weight total Fe.

This intermediate concentrate was magnetically separated into concentrated particles and insufficiently concentrated particles. By magnetically separating using a Rapid-O-type magnetic separator, made by Rapid Magnetic Machines, Co., under the following conditions: a belt speed of 2.5 m./min., a thickness of the intermediate concentrate on the belt of 0.3 mm., and a strongest magnetic flux density in magnetic field on the belt of about 20,000 gauss, a titanium dioxide concentrate of 95.4% $TiO_2$ and 2.3% total Fe was obtained as a non-magnetic fraction. The recovery of this non-magnetic fraction to the reduced ore was 33.6% on the basis of $TiO_2$.

The average value of the "Relative Magnetism" of this non-magnetic fraction was 21 on the basis of standard iron oxide ($\alpha$-$Fe_2O_3$) being 100 and that of the magnetic fraction was 196.

The standard iron oxide was prepared by the following method: The reagent special grade of ferrous sulfate was dissolved in pure water to prepare 1 liter of solution having a total Fe concentration of 100 g./liter and the liquid was heated to 90° C.

Air was introduced from an inlet having a porous layer into the liquid in the state of a fine bubble dispersion to oxidize the liquid and simultaneously ammonia gas was introduced therein to neutralize the liquid to maintain the pH of the liquid at 5.5 and the temperature at 90° C.

When iron in the ferric state in the liquid amounted to above about 60% of total iron after about two hours, the reaction was stopped and the formed slurry was filtered to separate the precipitate and thoroughly washed with pure water and air-dried. The hydrated iron oxide so obtained was calcined in a muffle furnace at 800° C. for 2 hours to make the standard iron oxide.

The "Relative Magnetism" was determined by measuring the weight increment for a 500 mg. sample in a position of 1,800 gauss in magnetic flux density by means of the Kinjo-Iwata type magnetic balance, type 130, made by Morishita Scientific Co., Ltd., and calculating the increment ratio of the sample on the basis of 100 in weight increment of said standard iron oxide. The magnetic flux density was measured at a position 39 mm. in height from the center level of the two magnetic poles and on the vertical central line between the poles (the distance between both poles was 35 mm).

Further, the magnetic fraction ($TiO_2$ 74.6%) was reduced, acid-leached and magnetically separated, in the same manner as in the case of the above-described ore to obtain a titanium dioxide concentrate of 96.1% $TiO_2$ and 1.41% total Fe as a non-magnetic fraction. The recovery of this non-magnetic fraction for the reduced ore was 57.1% on the basis of $TiO_2$. The above-identified average value of "Relative Magnetism" of this non-magnetic fraction was 15 and the value of the magnetic fraction was 219.

The remaining magnetic fraction, 66.7% $TiO_2$ and 19.2% total Fe, was returned to the reduction and leaching steps to be re-treated. The non-magnetic fraction was high in $TiO_2$ value and scarcely contained fines of below 200 mesh and had physical properties suitable for a fluidized bed type of operation.

The analytical values of the concentrates in all examples were those as analyzed on the materials calcined at 800° C. for 2 hours.

EXAMPLE 2

Ilmenite of Australian origin having the composition shown in Table 4 and the particle size distribution shown in Table 5 was used as a raw material ore.

TABLE 4

| Component: | Content (percent) |
|---|---|
| $TiO_2$ | 54.26 |
| Total Fe | 29.52 |
| FeO | 20.12 |
| $Fe_2O_3$ | 19.84 |

TABLE 5

| Particle size (mesh): | Content (percent) |
|---|---|
| 42–60 | 0.9 |
| 60–100 | 49.2 |
| 100–150 | 40.8 |
| 150–200 | 9.1 |

Industrial waste sulfuric acid (B) discharged from the hydrolysis step for the production of titanium dioxide by the sulfate process and having the composition shown in Table 6 was used as the mineral acid for leaching.

TABLE 6

| Component: | Content (g./l.) |
|---|---|
| Free $H_2SO_4$ | 275 |
| Total Fe | 41 |
| $TiO_2$ | 5.6 |

The ore and 3 liters of said waste sulfuric acid (B) per 1 kg. of ore were placed in an autoclave and maintained at 130° C. for 3 hours under stirring to preliminarily leach a part of the iron content, thereby obtaining a material of 58.2% $TiO_2$ and 28.1% total Fe. 100 parts by weight of the pre-leached material so obtained and 10 parts by weight of coke were mixed and heated for reduction in a furnace cut off from air at 900° C. for 1 hour, and, after cooling, the excess coke was removed by separation.

This reduced ore was leached with 3 liters of said waste sulfuric acid (A) per 1 kg. of the reduced ore in an autoclave at 130° C. for 6 hours and an intermediate concentrate of 79.4% $TiO_2$ and 13.7% total Fe was obtained. Subsequently, the intermediate concentrate was magnetically separated at about 20,000 gauss in the same manner as in Example 1 to obtain a concentrate of 95.3% $TiO_2$ and 2.6% total Fe as a non-magnetic fraction. The recovery of this non-magnetic fraction to the reduced ore was 40.3% on the basis of $TiO_2$. The average value of the "Relative Magnetism" of the non-magnetic fraction and magnetic fraction were measured in the same manner as in Example 1 and the values were 10 and 214, respectively.

Further, the magnetic fraction was reduced, acid-leached and magnetically separated in the same manner as in the above case of preleached material and titanium dioxide concentrate of 94.8% $TiO_2$ and 2.9% total Fe was obtained as a non-magnetic fraction. The recovery of this non-magnetic fraction to reduced ore was 27.8% on the basis of $TiO_2$. The remaining magnetic fraction, 80.1% $TiO_2$ and 13.0% total Fe, was re-treated in the same manner. The average values of the "Relative Magnetism" of the non-magnetic and magnetic fractions were 33 and 150, respectively.

EXAMPLE 3

The ore having the composition shown in table 1 in Example 1 and the particle size distribution shown in Table 2 was previously magnetically separated to remove the part not suitable for concentration. The magnetic separation was conducted using a Rapid-O-type magnetic separator, made by Rapid Magnetic Machines Co., under the following conditions: 2.5 m./min. in belt speed, 0.3 mm. in thickness of ore on the belt and 9,500 gauss in the strongest magnetic flux density on the belt. The fraction having the composition shown in Table 7 was collected as a non-magnetic fraction (not containing a non-magnetic fraction in 15,000 gauss) to use as a raw material fraction. The amount collected was 28% on the basis of the weight of ore. The average values of "Relative Magnetism" of the non-magnetic fraction and the magnetic fraction measured in the same manner as in Example 1 were 158 and 660, respectively.

TABLE 7

| Component: | Content (percent) |
| --- | --- |
| $TiO_2$ | 62.87 |
| Total Fe | 23.75 |
| FeO | 3.87 |
| $Fe_2O_3$ | 29.67 |

100 parts by weight of this collected fraction and 10 parts by weight of coke were mixed and heated for reduction in a furnace at 900° C. cut off from air for 1 hour and after cooling, excess coke was separated and removed.

The reduced ore was leached with 3 liters of the above-described waste sulfuric acid (A) per 1 kg. of the reduced ore at 130° C. for 6 hours to obtain an intermediate concentrate of 90.3% $TiO_2$ and 4.13% total Fe. Subsequently, the intermediate concentrate was magnetically separated in about 20,000 gauss as in Example 1, to obtain a concentrate of 95.3% $TiO_2$ and 1.93% total Fe as a non-magnetic fraction. The recovery of this non-magnetic fraction to the reduced ore was 70.4% on the basis of $TiO_2$. The average values of "Relative Magnetism" of the non-magnetic fraction and magnetic fraction measured by the same method as in Example 1 were 21 and 120, respectively. Further, after reducing said magnetic fraction, it was leached with an acid and magnetically separated in the same manner as described above to obtain a concentrate of 95.6% $TiO_2$ and 1.88% total Fe as a non-magnetic fraction. The recovery of this non-magnetic fraction to the reduced ore was 23.4% on the basis of $TiO_2$. The remaining magnetic fraction was 44.2% $TiO_2$ and 10.2% total Fe. The average values of "Relative Magnetism" of the non-magnetic fraction and the magnetic fraction were 25 and 127, respectively.

EXAMPLE 4

The ore having the composition shown in Table 4 and the particle size distribution shown in Table 5 was used as a raw material ore. 100 parts by weight of said ore and 10 parts by weight of petroleum coke were mixed and heated for reduction in a furnace at 900° C. cut off from air for 1 hour. The system was cooled while passing nitrogen gas therethrough, and after separating excess coke, was subjected to acid leaching.

Industrial waste sulfuric acid (C) discharged from the hydrolysis step for production of titanium dioxide by the sulfate process and having the composition shown in Table 8 was used as the mineral acid for leaching.

TABLE 8

| Component: | Content (g./l.) |
| --- | --- |
| Free $H_2SO_4$ | 350 |
| Total Fe | 30 |
| $TiO_2$ | 6.8 |

600 g. of the above reduced ore, 1800 ml. of the above waste sulfuric acid (C) and 87 ml. of seed (containing 3.3 g. of $TiO_2$) were charged into an autoclave and maintained at 130° C. for 8 hours (autoclave pressure: 1.5 kg./cm.$^2$ gauge). The seed was prepared by neutralizing a titanyl sulfate solution acidified sulfuric acid ($TiO_2$ 160 g./l.) with a 10% sodium hydroxide solution and aging it at 80° C. for 20 minutes. The seed contained a titanium value of 38 g./l. as $TiO_2$.

The intermediate concentrate separated from the leached liquid by filtration was sieved to remove fines of below 200 mesh in size and air-dried to obtain 436 g. of the intermediate concentrate which was 77.2% $TiO_2$ and 13.4% total Fe.

430 g. of this intermediate concentrate was magnetically separated into concentrated particles and insufficiently concentrated particles. This magnetic separation was conducted using a Rapid-O-type magnetic separator, made by Rapid Magnetic Machine Co., under the following conditions: 2.5 m./min. in belt speed, 0.3 mm. in thickness of intermediate concentrate on the belt, and about 20,000 gauss in the strongest magnetic flux density in magnetic field on the belt, to separate the intermediate concentrate into a non-magnetic fraction and a magnetic fraction.

Weights and compositions of the non-magnetic fraction and the magnetic fraction obtained, and the average values of the "Relative Magnetism" measured by the same method as in Example 1, are shown in Table 9.

TABLE 9

| | |
| --- | --- |
| Non-magnetic fraction: | |
| Weight (g.) | 159 |
| Grade of $TiO_2$ (percent) | 93.7 |
| Grade of total Fe (percent) | 1.1 |
| Relative magnetism | 9 |
| Magnetic fraction: | |
| Weight (g.) | 271 |
| Grade of $TiO_2$ (percent) | 69.3 |
| Grade of total Fe (percent) | 19.2 |
| Relative magnetism | 230 |

Next, 260 g. of the magnetic fraction in Table 9 was mixed with 559 g. of ore having the composition shown in Table 4 and the particle size distribution shown in Table 5 and 82 g. of petroleum coke and heated for reduction in a furnace cut off from air at 900° C. for 1 hour, and cooled while passing nitrogen gas therethrough, and after separating excess coke, subjected to acid-leaching.

810 g. of the above reduced material, 1620 ml. of waste sulfuric acid (C) and 5.0 g. of the above seed (as the weight of contained TiO$_2$) were charged into an autoclave and were maintained at 130° C. for 8 hours (autoclave pressure: 1.5 kg./cm.$^2$ gauge). After acid-leaching, 614 g. of the intermediate concentrate obtained by filtering, removing fines and air-drying was magnetically separated into a non-magnetic fraction and a magnetic fraction. Their weights, compositions and the average values of the "Relative Magnetism" were as shown in Table 10.

TABLE 10

Non-magnetic fraction:
- Weight (g.) _____ 319
- Grade of TiO$_2$ (percent) _____ 94.4
- Grade of total Fe (percent) _____ 1.5
- Relative magnetism _____ 13

Magnetic fraction:
- Weight (g.) _____ 295
- Grade of TiO$_2$ (percent) _____ 71.6
- Grade of total Fe (percent) _____ 16.9
- Relative magnetism _____ 193

The non-magnetic fractions shown in Tables 9 and 10 were high in TiO$_2$, contained very few fines of below 200 mesh in size and had physical properties suitable for use in a fluidized bed type of operation. The magnetic fraction shown in Table 10 was mixed with ore and the same re-treatment as described above was continued to obtain the same result.

EXAMPLE 5

Ore having the composition as in Table 1 and the particle size distribution as in Table 2 was used as a raw material ore. 100 parts by weight of said ore and 5 parts by weight of petroleum coke were mixed and heated for reduction in a furnace cut off from air at 900° C. for 1 hour and cooled while passing nitrogen gas therethrough, and, after separating excess coke, subjected to acid-leaching.

300 g. of the above reduced material and 600 ml. of 20% HCl were charged into an open vessel attached with a reflux condenser and reacted at the boiling point (about 108° C.) for 4 hours. The intermediate concentrate separated from the leached liquid by filtration after leaching was sieved to removed fines of below 200 mesh and air-dried to obtain 215 g. of an intermediate concentrate which was 86.0% TiO$_2$ and 6.6% total Fe.

200 g. of this intermediate concentrate was magnetically separated into concentrated particles and insufficiently concentrated particles. The magnetic separation was conducted using a Rapid-O-type separator, made by Rapid Magnetic Machine Co., under the following conditions: 2.5 m./min. in belt speed, 0.3 mm. in thickness of intermediate concentrate on the belt, and about 20,000 gauss in the strongest magnetic flux density in magnetic field on the belt, to separate it into a non-magnetic fraction and a magnetic fraction.

Weights and compositions of the non-magnetic fraction and the magnetic fraction obtained herein and their average values of "Relative Magnetism" measured by the same method as in Example 1 were as shown in Table 11.

TABLE 11

Non-magnetic fraction:
- Weight (g.) _____ 150
- Grade of TiO$_2$ (percent) _____ 92.8
- Grade of total Fe (percent) _____ 1.8
- Relative magnetism _____ 25

Magnetic fraction:
- Weight (g.) _____ 50
- Grade of TiO$_2$ (percent) _____ 65.8
- Grade of total Fe (percent) _____ 19.7
- Relative magnetism _____ 221

The non-magnetic fraction was a high grade titanium dioxide concentrate, containing very few fines of below 200 mesh and having physical properties suitable for use in a fluidized bed type of operation. The magnetic fraction was re-treated.

EXAMPLE 6

The ore having the composition shown in Table 1 and the particle size distribution shown in Table 2 was used as a raw material ore. 100 parts by weight of said ore and 5 parts by weight of petroleum coke were mixed and heated for reduction in a furnace at 900° C. cut off from air for 1 hour and cooled while passing nitrogen gas therethrough, and after separating excess coke, subjected to acid-leaching. The industrial waste sulfuric acid (C) discharged from the hydrolysis step for production of titanium dioxide by the sulfate process and having the composition shown in Table 8 was used as the mineral acid for leaching.

1 kg. of the above-reduced ore, 3 liters of the above waste sulfuric acid (C) and 92 ml. of a titanium(III)-titanous sulfate-salt solution (containing 12 g. of titanium (III) salt as TiO$_2$) were charged into an autoclave and maintained at 130° C. for 8 hours (autoclave pressure: 1.5 kg./cm.$^2$ gauge).

The titanous sulfate solution was prepared by adding a 20% excess of metallic iron powder over the stoichiometric amount necessary to convert titanyl sulfate into titanous sulfate, to a titanyl sulfate solution (TiO$_2$: 160 g./l.) acidifying with sulfuric acid and maintaining the solution at 80° C. for 2 hours. The titanous sulfate solution containined 130 g./l. titanous sulfate as TiO$_2$.

The intermediate concentrate separated from the leached liquid by filtration was sieved to remove fines of below 200 mesh in size and air-dried to obtain 782 g. of an intermediate concentrate which was 83.0% TiO$_2$ and 9.4% total Fe.

770 g. of this intermediate concentrate was magnetically separated into concentrated particles and insufficiently concentrated particles. This magnetic separation was conducted at about 20,000 gauss by the same method as in Example 4. Weights and compositions of the non-magnetic fraction and the magnetic fraction obtained and average values of their "Relative Magnetism" measured by the same method as in Example 1 were as shown in Table 12.

TABLE 12

Non-magnetic fraction:
- Weight (g.) _____ 432
- Grade of TiO$_2$ (percent) _____ 95.4
- Grade of total Fe (percent) _____ 1.3
- Relative magnetism _____ 14

Magnetic fraction:
- Weight (g.) _____ 338
- Grade of TiO$_2$ (percent) _____ 66.7
- Grade of total Fe (percent) _____ 16.6
- Relative magnetism _____ 196

Next, 330 g. of the magnetic fraction in Table 12 was mixed with 565 g. of ore having the composition shown in Table 1 and the particle size distribution shown in Table 2 and 45 g. of petroleum coke and heated for reduction in a furnace cut off from air at 900° C. for 1 hour, and cooled while passing nitrogen gas therethrough, and after separating excess coke, subjected to acid leaching.

800 g. of the above-reduced material, 2400 ml. of waste sulfuric acid (C) and 74 ml. of the above titanium(III) salt solution (containing 9.6 g. of titanium(III) salt as TiO$_2$) were charged into an autoclave and were maintained at 130° C. for 8 hours (autoclave pressure: 1.5 kg./cm.$^2$ gauge). After leaching, 651 g. of the intermediate concentrate obtained by filtering, removing fines and air-drying was magnetically separated into a non-magnetic fraction and a magnetic fraction. Their weights, compositions and average values of their "Relative Magnetism" were as shown in Table 13.

TABLE 13

Non-magnetic fraction:
- Weight (g.) _____ 423
- Grade of $TiO_2$ (percent) _____ 96.7
- Grade of total Fe (percent) _____ 1.1
- Relative magnetism _____ 12

Magnetic fraction:
- Weight (g.) _____ 228
- Grade of $TiO_2$ (percent) _____ 67.0
- Grade of total Fe (percent) _____ 16.4
- Relative magnetism _____ 194

The non-magnetic fractions shown in Tables 12 and 13 were high in $TiO_2$, contained very few fines of below 200 mesh and had physical properties suitable for use in a fluidized bed type of operation. The magnetic fraction shown in Table 13 was mixed with ore and the same re-treatment as described above was continued to obtain the same result.

What is claimed is:

1. A process for producing a titanium dioxide concentrate comprising the steps of:
   (1) leaching a titaniferous iron ore having a grain size larger than the apertures in a 200 mesh Tyler standard sieve with a mineral acid at a temperature above 80° C. for from 2 to 10 hours to concentrate its titanium value, said mineral acid being selected from the group consisting of sulfuric acid, hydrochloric acid and industrial waste acids containing any one or both of them;
   (2) magnetically separating the intermediate concentrate thus obtained into a non-magnetic fraction having an average value of "Relative Magnetism" of below 100 determined on the basis of the "Relative Magnetism" of standard iron oxide ($\alpha$-$Fe_2O_3$) being 100 and a magnetic fraction having an average value of "Relative Magnetism" larger than 100 to take out said non-magnetic fraction as a product; and
   (3) re-leaching said magnetic fraction with a mineral acid at a temperature above 80° C. for from 2 to 10 hours to concentrate the titanium value of said magnetic fraction.

2. The process as set forth in claim 1, wherein the particle size of said titaniferous iron ore is from 20 to 200 mesh measured by the Tyler standard.

3. The process as set forth in claim 2, wherein said titaniferous iron ore is produced from sand deposits.

4. The process as set forth in claim 1, wherein said titaniferous iron ore, prior to leaching with said mineral acid, is reduced at a temperature in the range of from 500 to 950° C. in the presence of a reducing agent to change at least most of the ferric iron value in said ore to ferrous iron value.

5. The process as set forth in claim 1, wherein said magnetic fraction magnetically separated is reduced to change at least most of the ferric iron value in said magnetic fraction to ferrous iron value which is then leached again with a mineral acid.

6. The process as set forth in claim 1, wherein said magnetic fraction magnetically separated is returned to any former step and mixed with the raw material of said step to be re-treated.

7. The process as set forth in claim 1, wherein said mineral acid is sulfuric acid whose concentration of free sulfuric acid varies from 100 to 600 g./l.

8. The process as set forth in claim 1, wherein said mineral acid is hydrochloric acid whose concentration of free hydrochloric acid varies from 100 to 300 g./l.

9. The process as set forth in claim 1, wherein said leaching is conducted in the presence of colloidal hydrated metallic oxide which functions as a seed for accelerating the hydrolysis of the titanium salt.

10. The process as set forth in claim 9, wherein said colloidal hydrated metallic oxide is selected from the group consisting of hydrated titanium oxide, hydrated tin oxide, hydrated niobium oxide and hydrated tantalum oxide.

11. The process as set forth in claim 1, wherein said leaching is conducted in the presence of a titanium(III) salt.

12. The process as set forth in claim 1, wherein said leaching is conducted in the presence of fluorine ion.

13. A process for producing a titanium dioxide concentrate comprising the steps of:
   (1) pre-leaching a titaniferous iron ore having a grain size larger than the apertures in a 200 mesh Tyler standard sieve with a mineral acid at a temperature above 80° C. to dissolve and remove a part of the iron value in said ore;
   (2) reducing said pre-leached material at a temperature in the range of from 500 to 950° C. in the presence of a reducing agent to change at least most of the ferric iron value in said pre-leached material to a ferrous iron value;
   (3) leaching said reduced material with a mineral acid at a temperature above 80° C. for from 2 to 10 hours to concentrate the titanium value therein to form an intermediate concentrate, said mineral acid being selected from the group consisting of sulfuric acid, hydrochloric acid and industrial waste acids containing any one or both of them;
   (4) magnetically separating the intermediate concentrate into a non-magnetic fraction having an average value of "Relative Magnetism" of below 100 determined on the basis of the "Relative Magnetism" of standard iron oxide ($\alpha$-$Fe_2O_3$) being 100 and a magnetic fraction having an average value of "Relative Magnetism" larger than 100 to take out said non-magnetic fraction as a product; and
   (5) re-leaching said magnetic fraction with a mineral acid at a temperature above 80° C. for from 2 to 10 hours to concentrate the titanium value therein.

14. The process as set forth in claim 13, wherein said magnetic fraction magnetically separated in said step (4) is returned to any former step and mixed with the raw material of said step to be re-treated.

15. A process for producing a titanium dioxide concentrate comprising the steps of:
   (1) magnetically separating a titaniferous iron ore having a grain size larger than the apertures of a 200 mesh Tyler standard sieve to remove particles having a "Relative Magnetism" less than 100 and more than 400, said "Relative Magnetism" being based on standard iron oxide ($\alpha$-$Fe_2O_3$) having a "Relative Magnetism" of 100 and collecting the remaining fraction;
   (2) reducing the collected fraction at a temperature in the range of from 500 to 950° C. in the presence of a reducing agent to change most of the ferric value thereof to a ferrous value;
   (3) leaching the reduced material with a mineral acid at a temperature above 80° C. for from 2 to 10 hours to concentrate the titanium value thereby producing an intermediate concentrate, said mineral acid being selected from the group consisting of sulfuric acid, hydrochloric acid and industrial waste acids containing any one or both of them;
   (4) magnetically separating said intermediate concentrate into a non-magnetic fraction having an average value of "Relative Magnetism" below 100 on the basis of standard iron oxide ($\alpha$-$Fe_2O_3$) having a "Relative Magnetism" of 100 and a magnetic fraction having an average value of "Relative Magnetism" larger than 100 to take out said non-magnetic fraction as a product; and
   (5) re-leaching said magnetic fraction with a mineral acid at a temperature above 80° C. for from 2 to 10 hours to concentrate the titanium value.

16. The process as set forth in claim 15, wherein said magnetic fraction magnetically separated in said step (4) is returned to any former step and mixed with the raw material of said step to be re-treated.

References Cited
UNITED STATES PATENTS

| | | |
|---|---|---|
| 2,954,278 | 9/1960 | Gaskin et al. _____ 423—80 |
| 3,660,029 | 5/1972 | Naguib _____ 423—80 |
| 3,446,590 | 5/1969 | Michal et al. _____ 428—80 |
| 2,480,869 | 9/1949 | Mayer. |
| 1,891,911 | 12/1932 | Brode et al. |
| 3,467,037 | 7/1969 | Aramendis et al. |
| 1,758,472 | 5/1930 | Schnetka. |
| 3,112,178 | 11/1963 | Judd _____ 423—80 |
| 1,760,992 | 6/1930 | Palmer. |
| 1,699,173 | 1/1929 | Whittemore. |

HERBERT T. CARTER, Primary Examiner

U.S. Cl. X.R.

423—82, 86; 75—1